(No Model.)  8 Sheets—Sheet 1.
W. H. WELSH.
MACHINE FOR DRESSING AND GROOVING TYPE.

No. 380,004. Patented Mar. 27, 1888.

WITNESSES  
Isaac S. Pear  
Walter E. Lombard.

INVENTOR:  
Wm H. Welsh.  
by N. C. Lombard  
Attorney.

(No Model.) 8 Sheets—Sheet 2.

W. H. WELSH.
MACHINE FOR DRESSING AND GROOVING TYPE.

No. 380,004. Patented Mar. 27, 1888.

WITNESSES:
Isaac S. Pear
Walter E. Lombard

INVENTOR:
Wm. H. Welsh.
by N. C. Lombard
Attorney

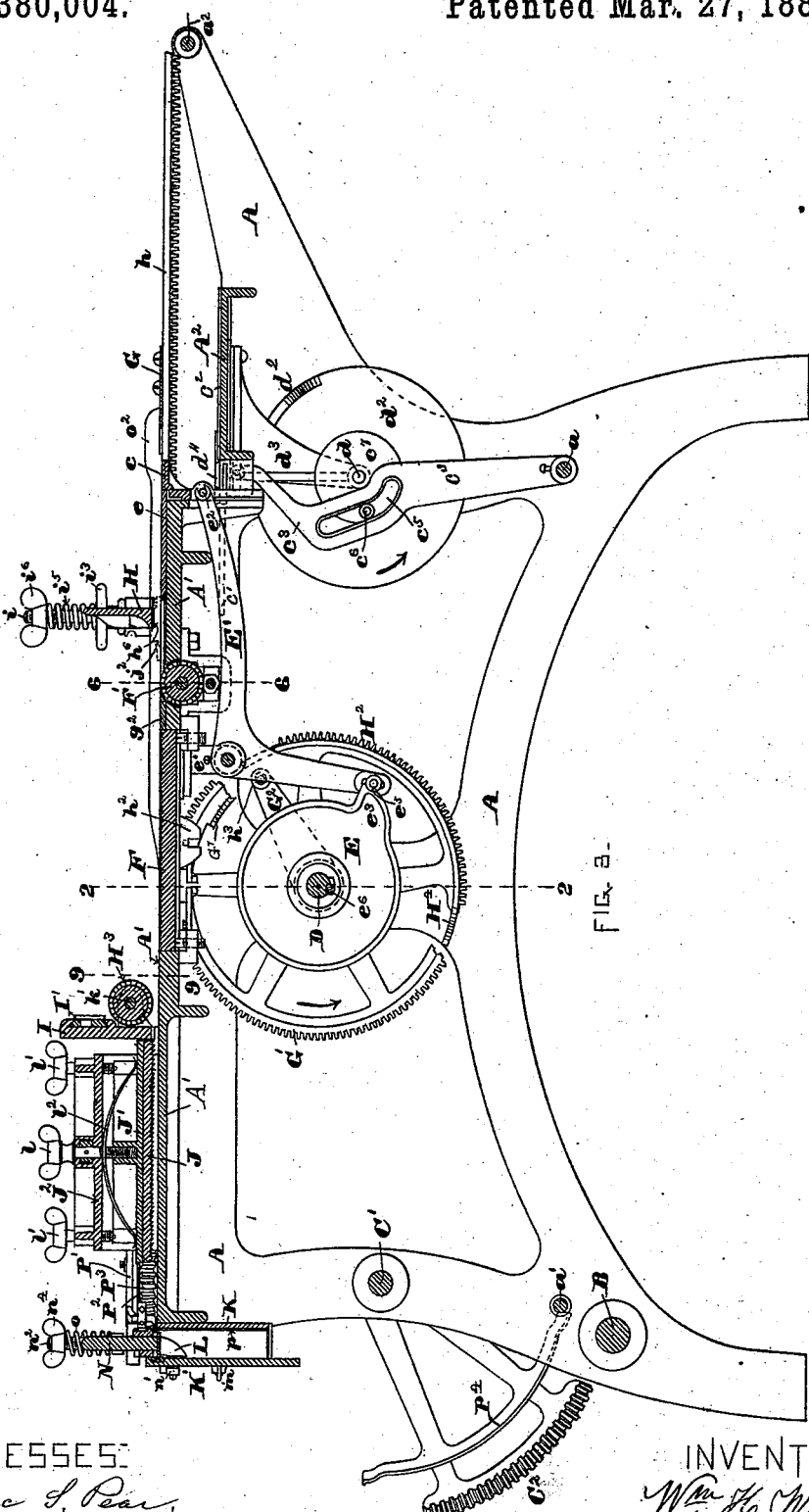

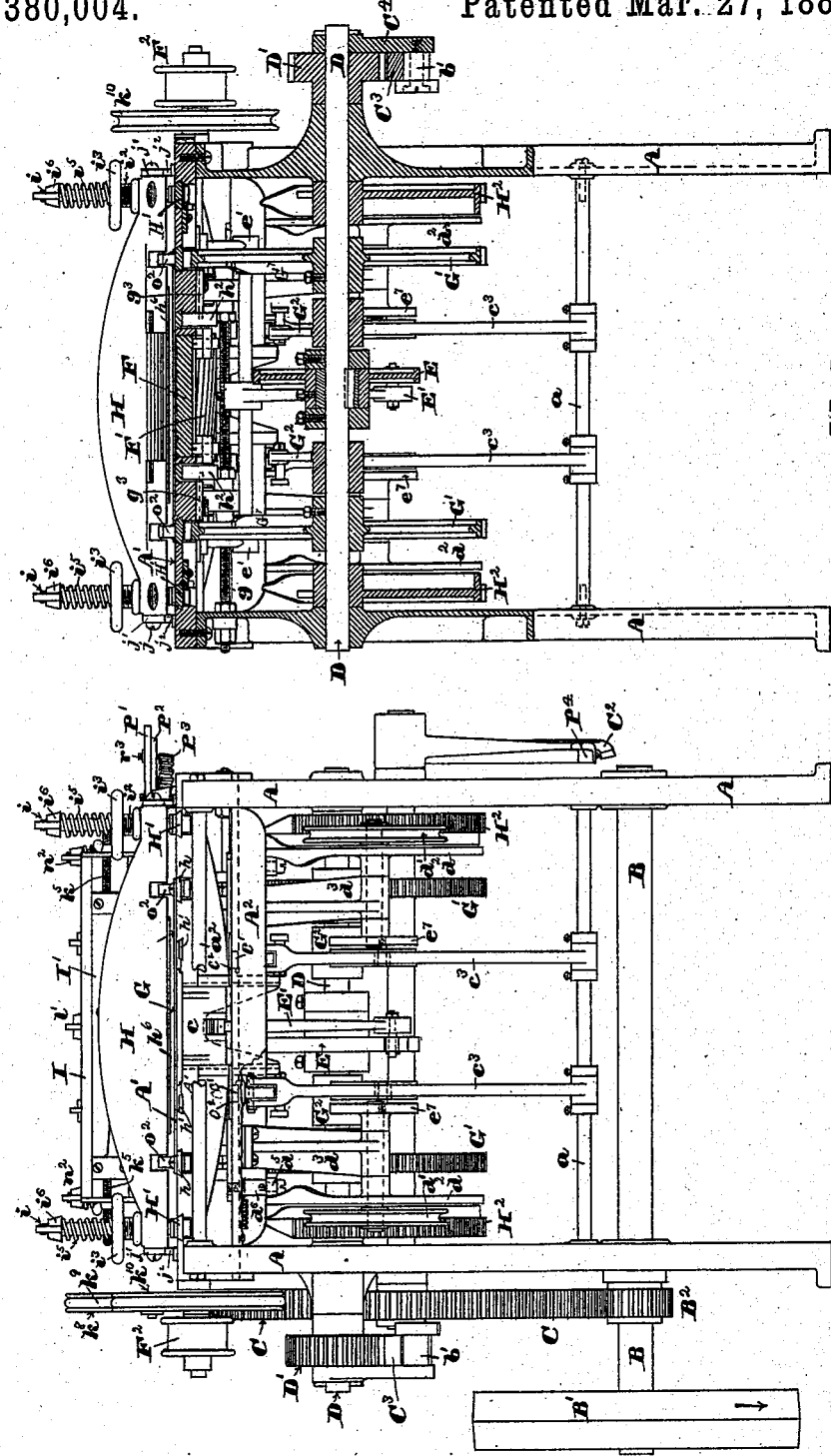

(No Model.) 8 Sheets—Sheet 5.
W. H. WELSH.
MACHINE FOR DRESSING AND GROOVING TYPE.
No. 380,004. Patented Mar. 27, 1888.
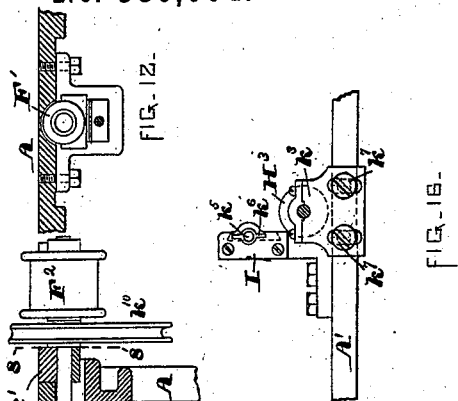
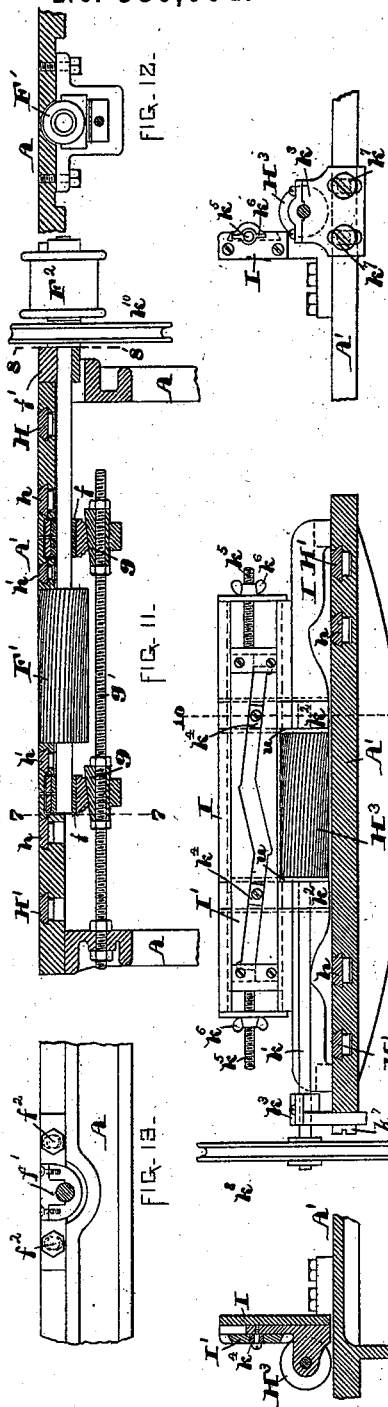
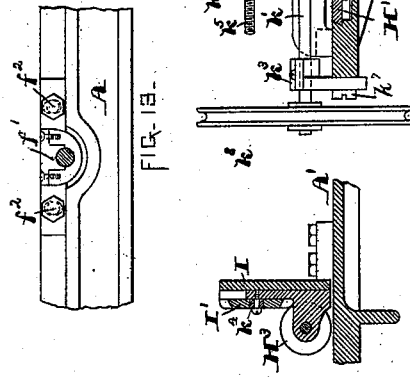
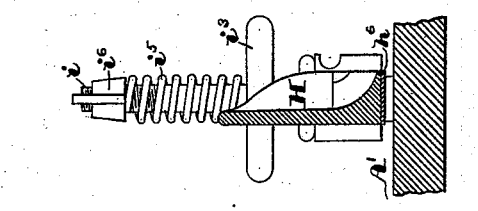
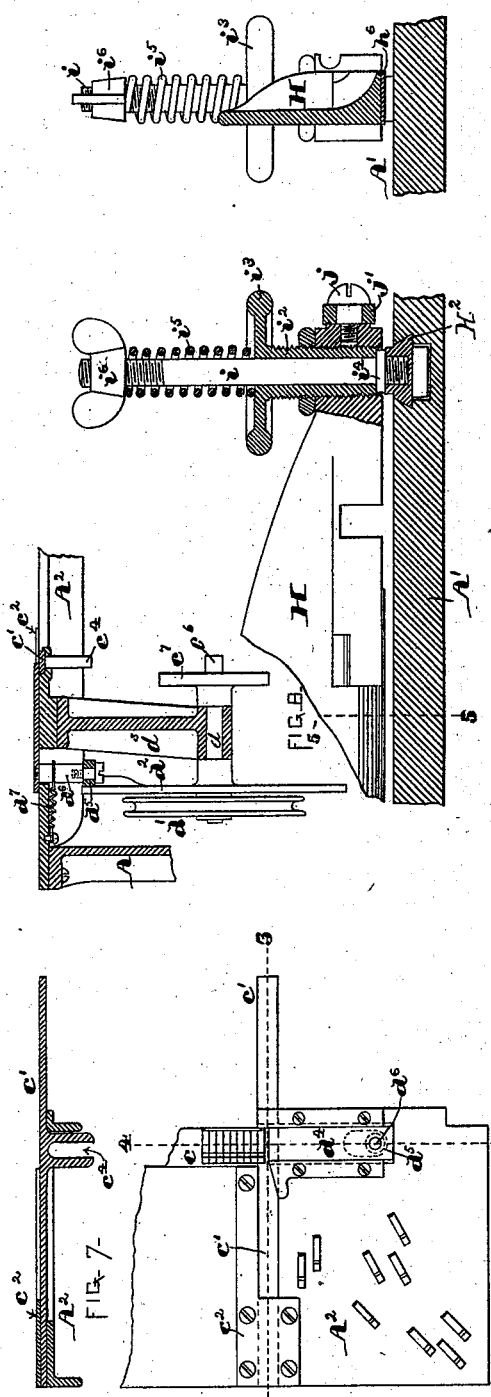
WITNESSES:
Isaac S. Pear
Walter E. Lombard
INVENTOR:
Wm. H. Welsh
by N. C. Lombard
Attorney

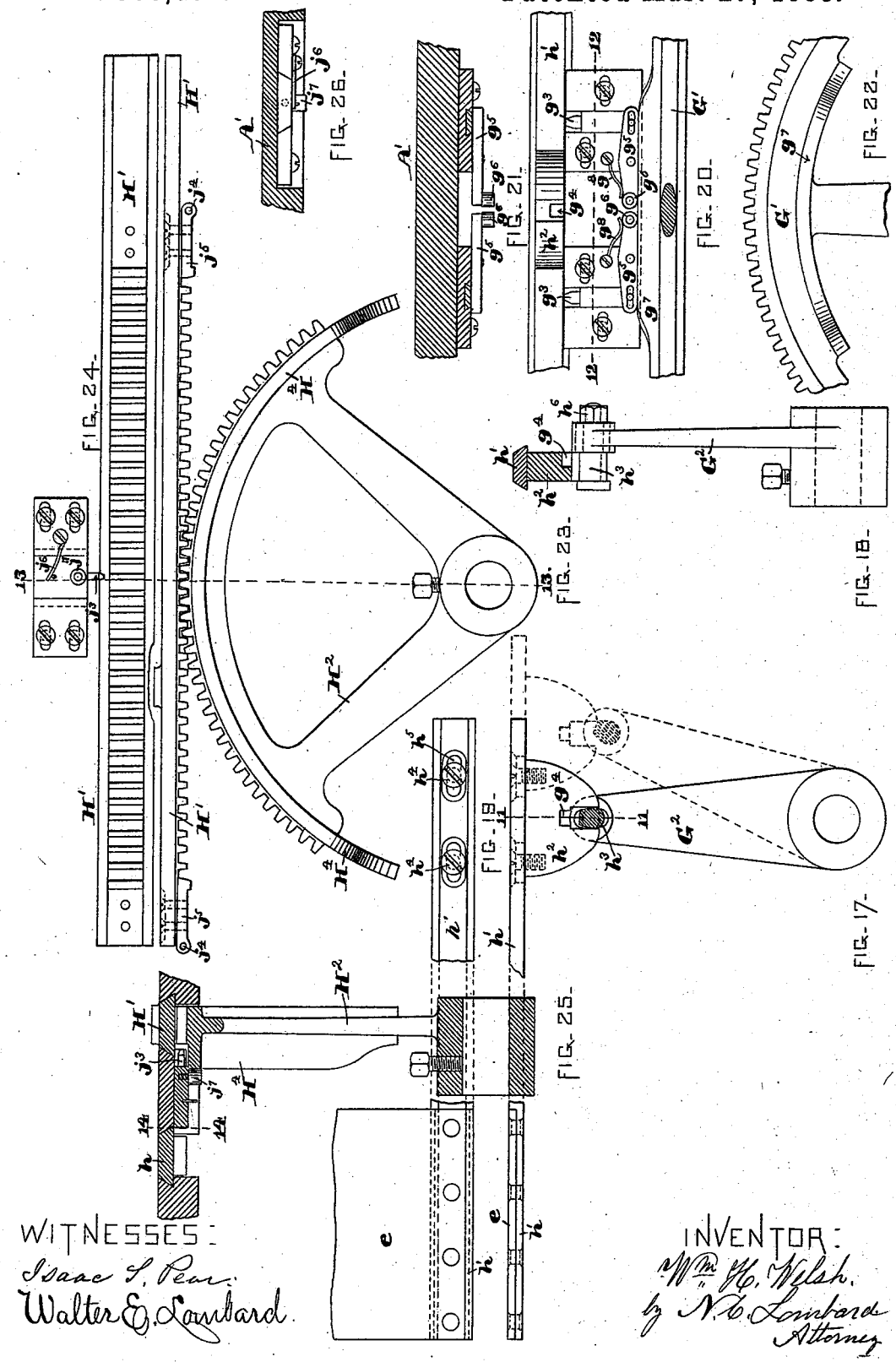

(No Model.) 8 Sheets—Sheet 7.
W. H. WELSH.
MACHINE FOR DRESSING AND GROOVING TYPE.
No. 380,004. Patented Mar. 27, 1888.
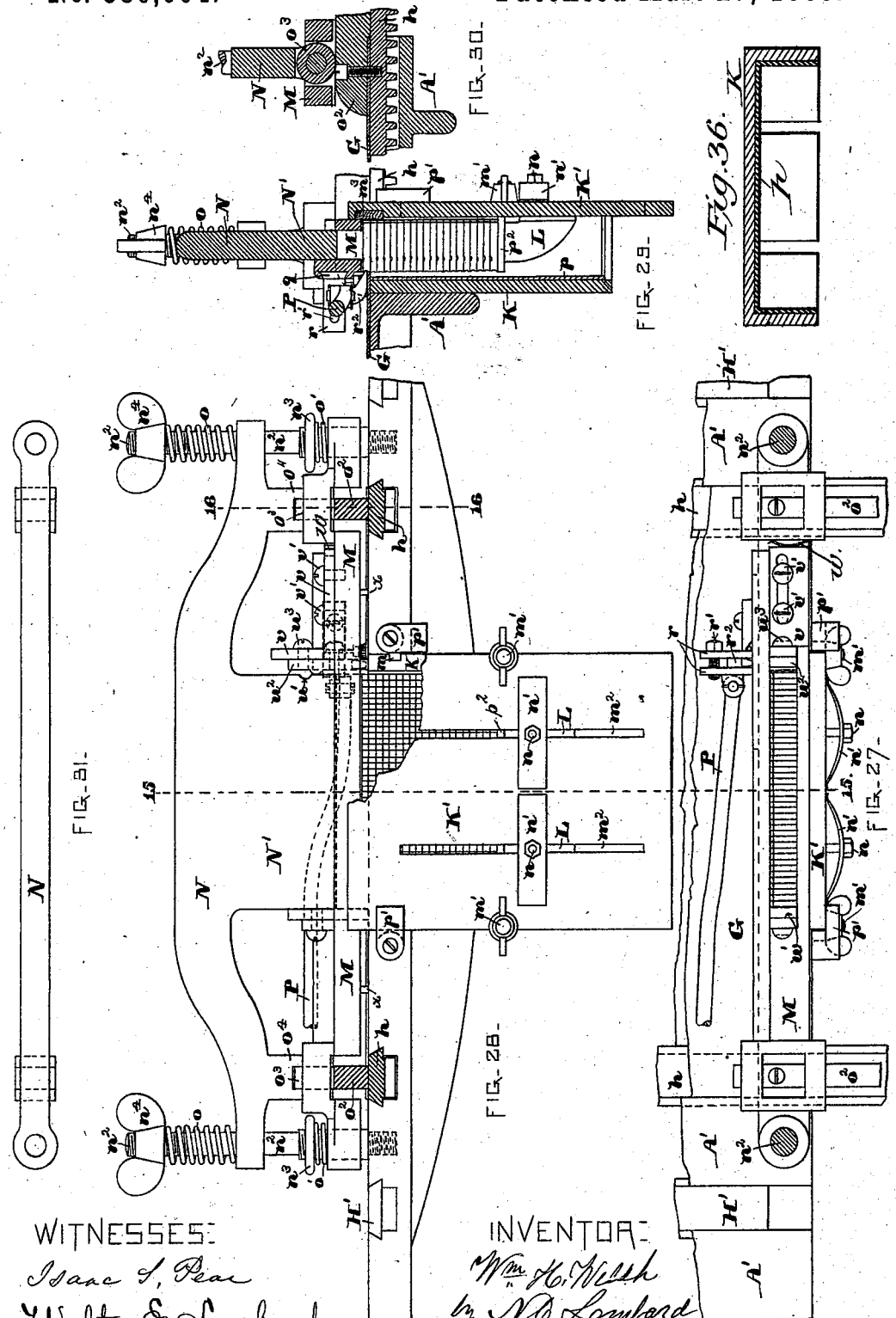

(No Model.) 8 Sheets—Sheet 8.
W. H. WELSH.
MACHINE FOR DRESSING AND GROOVING TYPE.
No. 380,004. Patented Mar. 27, 1888.
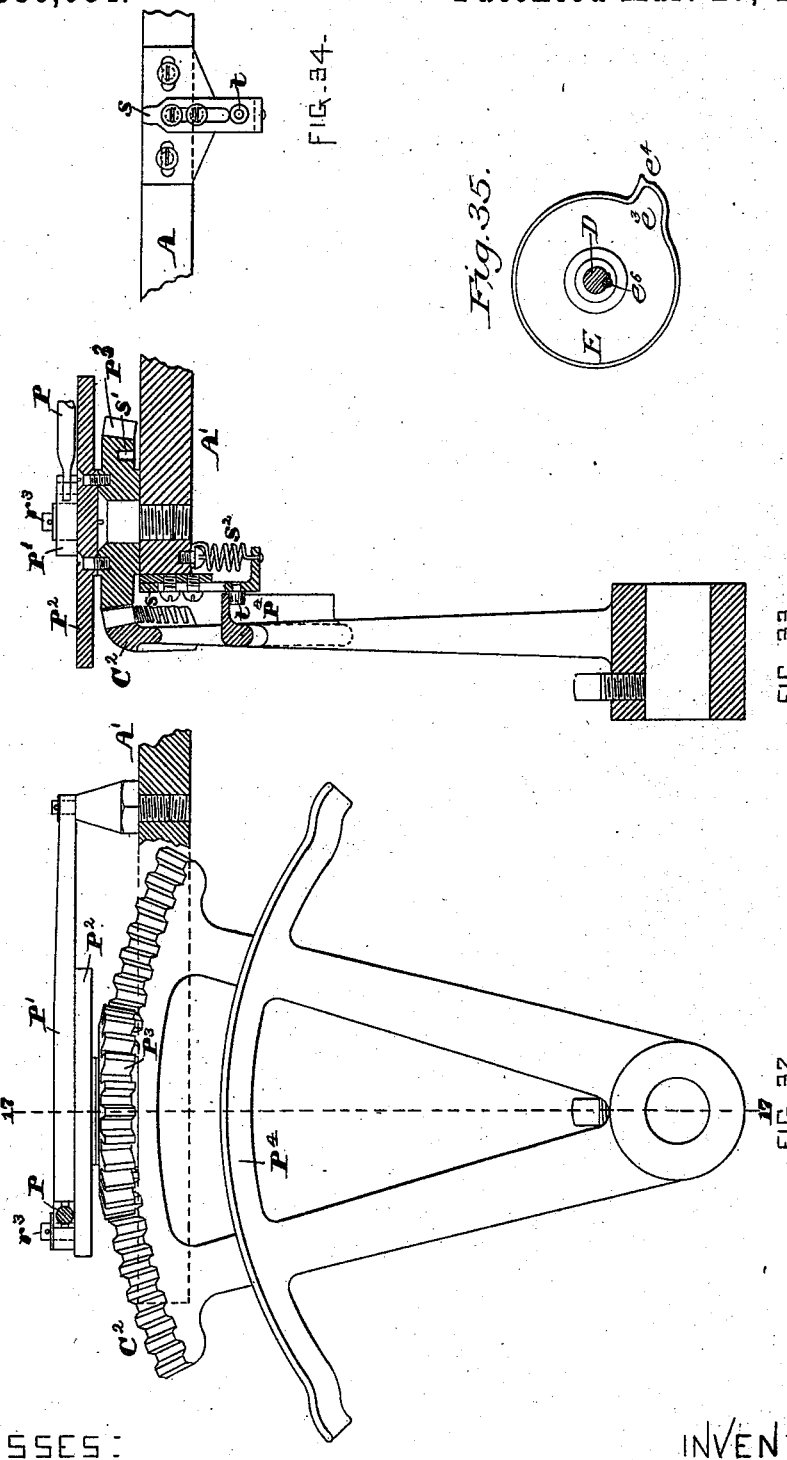

UNITED STATES PATENT OFFICE.

WILLIAM H. WELSH, OF SOMERVILLE, MASSACHUSETTS.

MACHINE FOR DRESSING AND GROOVING TYPE.

SPECIFICATION forming part of Letters Patent No. 380,004, dated March 27, 1888.

Application filed May 29, 1886. Serial No. 203,584. (No model.)

*To all whom it may concern:*

Be it known that I, WILLIAM H. WELSH, of Somerville, in the county of Middlesex and State of Massachusetts, have invented certain new and useful Improvements in Machines for Dressing and Grooving Type, of which the following, taken in connection with the accompanying drawings, is a specification.

My invention relates to machines for dressing and grooving the bodies of cast-metal type and reducing said bodies to a uniform predetermined size, and is an improvement upon the invention described in Letters Patent No. 266,932, granted to Charles W. Woodward and myself October 31, 1882; and it consists in certain novel features of construction, arrangement, and combination of parts, which will be best understood by reference to the description of the drawings and to the claims to be hereinafter given.

Figure 1:
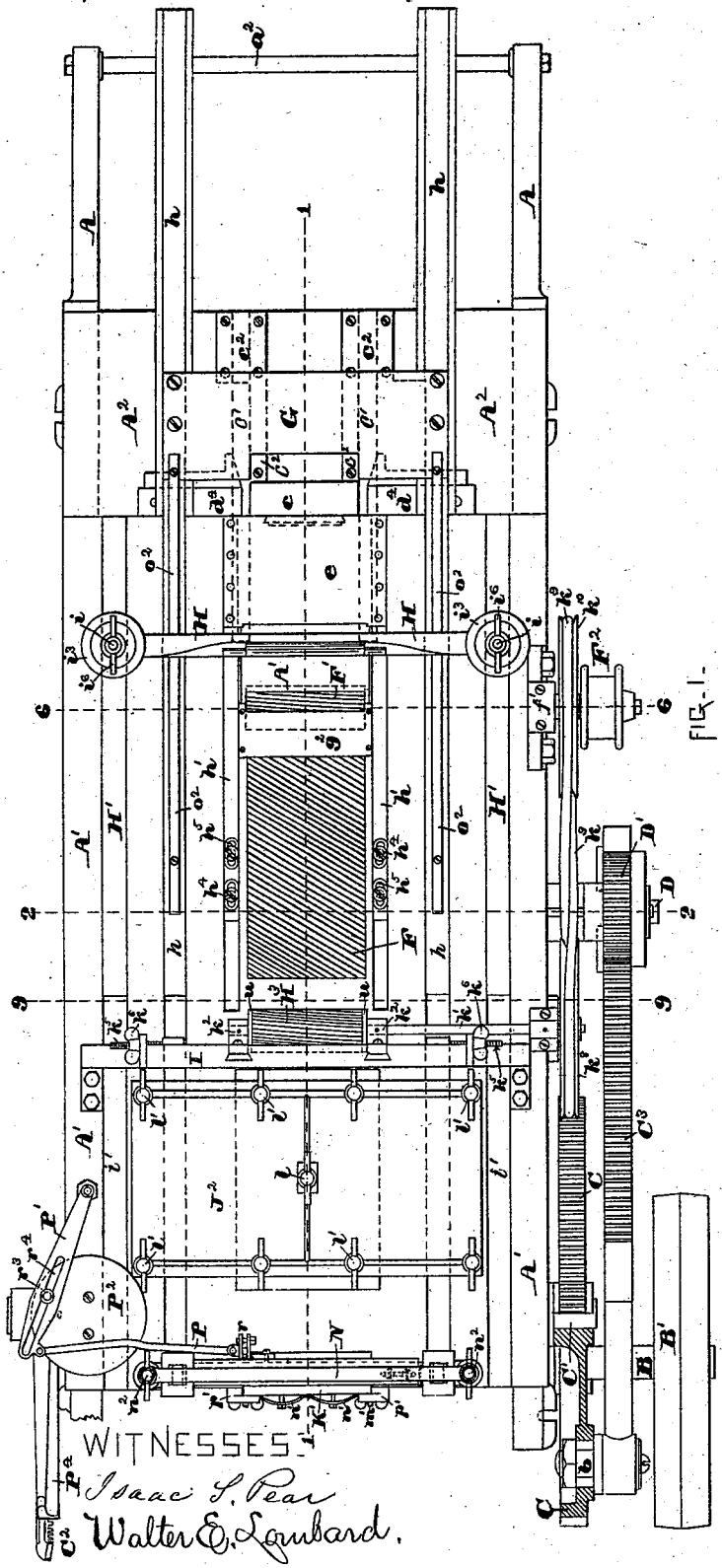
Figure 2:
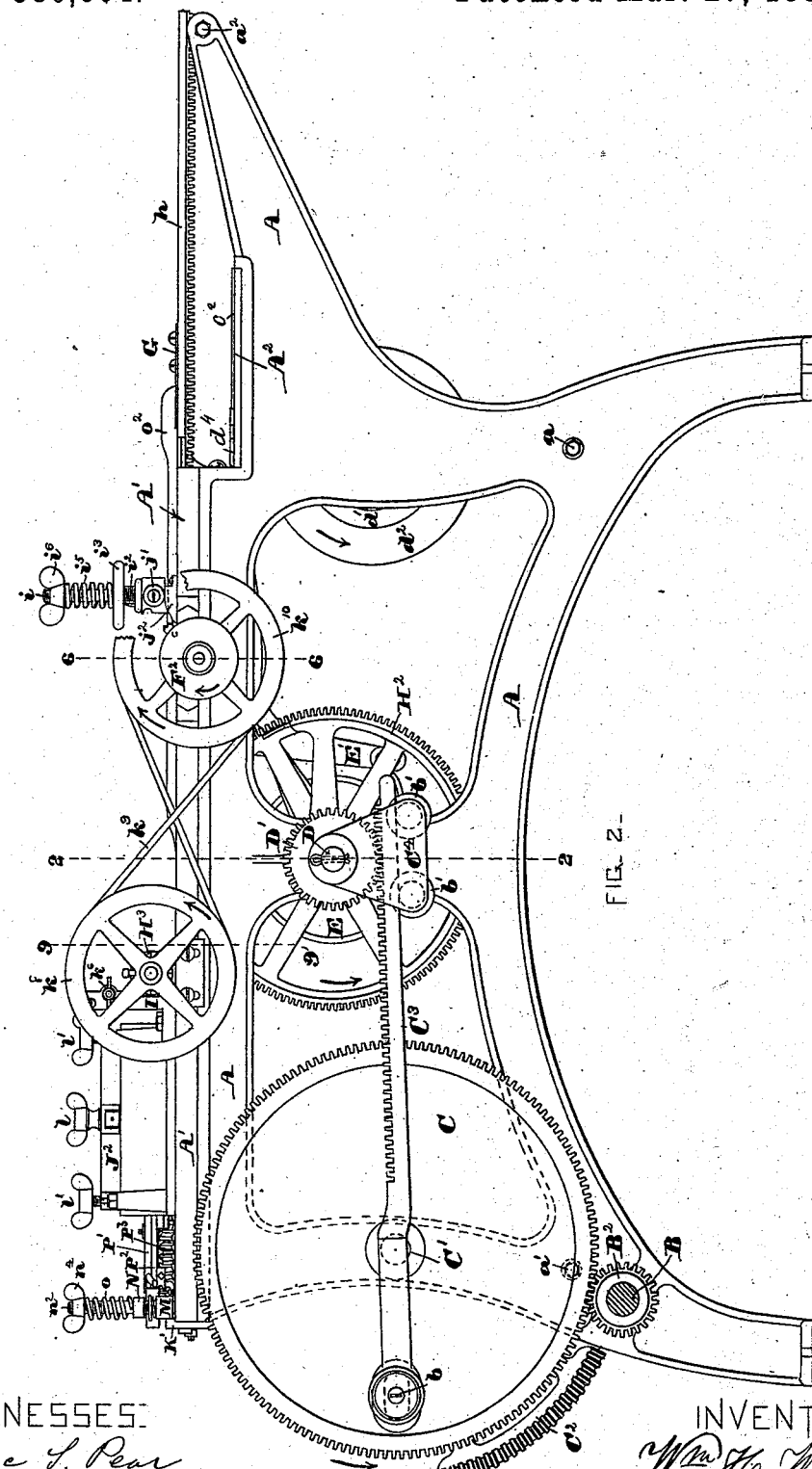

Figure 1 of the drawings is a plan of a machine embodying my invention. Fig. 2 is a side elevation of the same. Fig. 3 is a vertical section on line 1 1 on Fig. 1, and showing the parts beyond in elevation, with a portion of the gear-wheel G' broken away. Fig. 4 is an end elevation of the same, looking toward the left-hand end of Figs. 1 and 2. Fig. 5 is a vertical section on line 2 2 on Figs. 1, 2, and 3, looking toward the right-hand end of said figures. Fig. 6 is a plan of one end of the feed or setting-up table, a portion of the elevator, and the carrier and plunger for feeding the type thereto. Fig. 7 is a section on line 3 3 on Fig. 6. Fig. 8 is a section on line 4 4 on Fig. 6, looking toward the left hand of said figure. Fig. 9 is a sectional elevation of a portion of the presser-bar or cross-head for gaging the size of the type-body as it is moved over the lower cutter and rubbing-surface. Fig. 10 is a transverse section of the same on line 5 5 on Fig. 9. Fig. 11 is a transverse section through the table on line 6 6 on Figs. 1, 2, and 3, showing the lower cutter-cylinder in elevation, with the means of adjusting it vertically. Fig. 12 is a vertical section on line 7 7 on Fig. 11. Fig. 13 is a transverse section of the lower cutter-shaft on line 8 8, and showing the outer bearing for said shaft in elevation. Fig. 14 is a transverse section of the table on line 9 9 on Figs. 1, 2, and 3, and showing the upper cutter-cylinder, the pulley for rotating it, and the devices for adjusting it vertically in elevation. Fig. 15 is a vertical section on line 10 10 on Fig. 14. Fig. 16 is an end elevation of the upper cutter-cylinder, its adjusting mechanism, and its outer bearing, with its shaft cut in section. Fig. 17 is a side elevation of one of the reciprocating bars which carry the type supporting plate and the lever for operating the same, a portion of the middle of said bar being broken away. Fig. 18 is a sectional elevation of the same parts, the cutting-plane being on line 11 11 on Fig. 17. Fig. 19 is a plan of a portion of said bar and plate, with a portion of the middle of said bar broken away. Fig. 20 is an inverted plan of the devices for locking said bar at each extreme of its reciprocation. Fig. 21 is a section on line 12 12 on Fig. 20. Fig. 22 is an elevation of a portion of the large gear-wheel, with the cam formed thereon for operating said locking devices. Fig. 23 is a side elevation of the rack and segment for reciprocating the type-clamping cross-head or presser-bar. Fig. 24 is an inverted plan of said rack, with the device for locking the same at the end of its movement in either direction. Fig. 25 is a vertical section on line 13 13 on Figs. 23 and 24, showing a portion of the table in section. Fig. 26 is a section on line 14 14 on Fig. 25, and showing the locking-bolt and its bearing in elevation. Fig. 27 is a plan of a portion of the table, the packing-box for receiving the type after they are dressed, and the device for planing the groove in the end of the type. Fig. 28 is an elevation of the rear side of said packing-box, the vertically-movable gage and pressure bars, and showing the toothed rack-bars which carry the type-feed plate and the reciprocating cam-bars for operating the pressure feed-bar in section. Fig. 29 is a vertical section on line 15 15 on Figs. 27 and 28. Fig. 30 is a vertical section on line 16 16 on Fig. 28. Fig. 31 is a plan of the vertically-moving presser-bar. Fig. 32 is an elevation of the devices for operating the cutter for grooving the ends of the type, with the connecting-rod and a small portion of the table in section. Fig. 33 is a section on line 17 17 on Fig. 32, and showing the bolt for locking said cutter at each extreme of its reciprocation. Fig. 34 is an elevation of said locking-bolt and a portion of the table. Fig. 35 is an elevation of the cam for raising the elevator; and Fig. 36 is a horizontal section through the box K and its lining, and showing the slotted bottom of said box in plan. Figs. 1, 2, 3, 4, 5, and 35 are drawn to the same scale, Figs. 6, 7, 8, 11, 12, 13, 14, 15, and 16 to an enlarged scale, and all the other figures to a still larger scale.

In the drawings, A A are the side frames of the machine, connected together by the tie-rods $a$, $a'$, and $a^2$, the main table A', and the feed-table $A^2$.

B is the driving-shaft, mounted in suitable bearings in the frames A A, and having mounted thereon the driving-pulley B' and the pinion $B^2$, which meshes into and imparts motion to the spur gear-wheel C, firmly secured upon one end of the shaft C', also mounted in bearings in the frames A A, and having mounted upon its opposite end the toothed segment $C^2$, the office of which will be hereinafter described.

A crank-pin, $b$, is adjustably set in the web of the wheel C, as shown in Figs. 1 and 2, upon which crank-pin is mounted one end of the toothed rack $C^3$, the other end of which rests upon the two flanged trucks $b'$ $b'$, mounted upon studs set in the plate $C^4$, mounted upon and pendent from the end of the shaft D, upon which it is loosely fitted, while just inside said plate the pinion D' is firmly secured upon the shaft D in position to be engaged by the teeth of the rack $C^3$, as shown in Fig. 2, so that as the rack $C^3$ is reciprocated by the rotation of the gear-wheel C the pinion D' and shaft D will be moved about the axis of said shaft nearly an entire revolution in one direction by the forward motion of said rack and in the opposite direction an equal distance by the backward motion of said rack.

$A^2$ is the feed or setting-up table, secured at each end to one of the frames A, with its upper surface about two inches (more or less) below the upper surface of the main table A', as shown in Figs. 2 and 3. The central portion of said feed-table is made narrower than the end portions, so as to form in its rear edge a rectangular notch or recess to receive the table of the vertically-reciprocating elevator $c$ when in its lowest position, with its upper surface flush with or very slightly below the upper surface of said feed-table.

The feed-table has formed in its upper surface two shallow grooves extending across the same just outside of the recess or opening for the elevator $c$ and parallel with the side frames of the machine, in which grooves are fitted the reciprocating bars $c'$ $c'$, with their upper surfaces just flush with the upper surface of the feed-table, so that the type, some of which are shown upon said table in Fig. 6, may be slid from said table upon said bar one at a time, with their sides resting against the edge of the gage-plates $c^2$ $c^2$, secured to the upper surface of said feed-table.

The bars $c'$ have a reciprocating motion imparted thereto by the pivoted levers $c^3$ $c^3$, the upper ends of which engage with the forks $c^4$, projecting downward from said bars, and which levers are each provided with the curved slot $c^5$, with which the crank-pin $c^6$, set in the disk $c^7$, engages to impart a vibratory motion to said levers at each revolution of the shaft $d$, which carries said disk $c^7$ at one end, the pulley $d'$ and cam $d^2$ at its other end, and has its bearing in the stand $d^3$, bolted to the under side of the feed-table $A^2$, and is revolved by means of a belt (not shown) leading from the pulley $d'$ to any convenient driving or counter shaft independent of the other moving parts of the machine.

Two reciprocating plungers, $d^4$ $d^4$, are fitted to suitable guideways upon the upper surface of the feed-table, one upon each side of the elevator $c$, to each of which an endwise movement is imparted in one direction by the side cam, $d^2$, acting upon the truck $d^5$, mounted upon the stud $d^6$, projecting downward therefrom, and in the other direction by the spring $d^7$, as shown in Fig. 8. The elevator $c$ is intermittently moved from a position with its upper surface on a level with the upper surface of the feed-table to a position with its upper surface on a level with the upper surface of the main body of the table A' and the steel plate $e$ by the action of the cam E upon the elbow-lever E', pivoted to the stand $e'$, secured to the under side of the table A, the free end of the long arm of said lever being forked and engaging with a pin, $e^2$, set in the upright portion of said elevator, all as shown in Fig. 3.

The cam E is mounted loosely upon the shaft D and connected thereto by a spline-key, $e^6$, set in said shaft and projecting into a slot in the hub of said cam, said slot having a circumferential width somewhat greater than the width of said key in the same direction, so that the shaft D may move a short distance about its axis in either direction before engaging with the cam to move it in unison therewith, all as shown in Fig. 3.

The cam E is provided with a projection, $e^3$, upon one side, adapted to move the elevator to a point with its upper surface a short distance above the upper surface of the plate, and with a detent-notch, $e^4$, into which the truck $e^5$ on the lever E drops, as shown in Fig. 3, to allow the elevator to assume a position with its upper surface on a level with the upper surface of the plate $e$, where it remains until the motion of the shaft D is reversed and has moved sufficiently far in the opposite direction for the key $e^6$ to come in contact with the opposite side of the slot or groove in the hub of the cam.

The front end of the table A', or the end toward the feed-table $A^2$, has its central portion recessed or reduced in thickness to receive the plate $e$, the upper surface of which is on a level with the upper surface of the main body of said table A', which has cut through it a rectangular opening to receive the abrading or grinding plate F, which may be a slab of grindstone or a plate of steel having its upper surface cut in the form of a file and supported upon adjusting-screws, with the points of its teeth on a level with the upper surface of the main body of the table A', as shown in Fig. 3.

Just forward of the abrading-surface F a narrower opening is cut through the table A, in which revolves the cutter-cylinder F', having its periphery provided with file-like teeth and mounted in adjustable bearings $f\ f$ and $f'$, the two former resting upon the wedges $g\ g$, movable endwise by the screw $g'$, and the latter adjustable vertically by means of the clamping-bolts $f^2 f^2$, which pass through slots in the bearing $f'$ and screw into the edge of the table A', all as shown in Figs. 3, 11, 12, and 13.

Between the abrading-plate F and the rotary cutter-cylinder F' a thin steel plate, $g^2$, is set into the table, so that its upper surface is on a level with the upper surface of the main body of the table A', and having its edge next to the cylinder F' cut away to a thin knife-edge on a curve corresponding to the curve of the periphery of said cutter-cylinder, as shown in Fig. 3.

The cutter-cylinder F' is revolved at a high rate of speed by means of the pulley $F^2$ and a belt leading therefrom to any suitable driving or counter shaft. (Not shown.)

G is the type-feed plate, attached at each end to a toothed rack-bar, $h\ h$, fitted to dovetailed grooves extending longitudinally through the whole length of the table A', the under side of said plate being located slightly above the upper surface of said table, so as to pass freely over the same when the racks are moved to and fro by the action thereon of the spur gear-wheels G', firmly secured upon the shaft D, so as to oscillate therewith. The plate G has formed in its inner edge a rectangular notch of a length equal to the length of the line of type to be set up on the elevator-plate $c$.

The type-carrying plate $e$ is secured at each end to a dovetailed bar, $h'\ h'$, fitted to and movable endwise in correspondingly-shaped grooves formed in the table A', parallel with the rack-bars $h\ h$, and each having adjustably secured to its under side the forked lug $h^2$, which projects through a slot formed in said table, and with which the tooth $h^3$, attached to the upper end of the arm $G^2$, firmly secured upon the shaft D, engages at the proper time to move said plate toward the cutter-cylinder F' until the end portions of the inner edge of said plate $e$ come in contact with the end portions of the plate $g^2$, when the tooth $h^3$ will be disengaged from said forked lug, as shown in dotted lines in Fig. 17, and the movement of said plate will cease with its inner beveled edge partially covering the cutter-cylinder F' and nearly in contact therewith, in which position it is locked by the bolt $g^3$, the end of which engages with the notch $g^4$, formed in the forked lug $h^2$, as shown in Figs. 17 and 20.

There are two pairs of bolts $g^3$, mounted in suitable slides secured to the under side of the table A' in positions to alternately lock said lugs $h^2$ at each extreme of their movements, each bolt being connected to one end of a lever, $g^5$, pivoted to the under side of the table A' and carrying at its other end a truck, $g^6$, upon which the segmental cam $g^7$, formed upon the gear-wheel G', acts to withdraw said bolts $g^3$ from engagement with the notch or recess formed in the lug $h^2$, the truck end of said levers $g^5$ being pressed toward said cam to cause said bolts to engage with the notches or recesses $g^4$ in the lugs $h^2$ by the springs $g^8$, all as shown in Figs. 17, 18, 20, 21, and 22.

The lug $h^2$ is secured to the bar $h'$ by means of the screws $h^4 h^4$, which pass through slots $h^5 h^5$ in said bar and screw into said lug, as shown in Figs. 17 and 19, whereby said lug may be adjusted upon said bar to regulate the limit of the inward movement of the plate $e$. The tooth $h^3$ is made in the form of a stud set in a slot in the end of the arm $G^2$ so as to be adjustable therein and secured in the desired position by the clamping-nut $h^6$, as shown in Figs. 17 and 18.

H is a presser-bar or cross-head having the central portion of its lower surface covered with rubber, $h^6$, to adapt it to press upon type of slightly-varying thicknesses, said presser-bar being mounted upon vertical studs $i\ i$, set in the toothed rack-bars H' H', fitted to and movable endwise in dovetailed grooves $i'\ i'$, formed in and extending longitudinally of the table A', as shown in Fig. 1.

In each end of the presser-bar H is fitted the threaded sleeve $i^2$, provided at its upper end with the hand-wheel $i^3$, by means of which said sleeve may be adjusted vertically in said bar. The sleeves $i^2$ are fitted to the studs $i\ i$, with their lower ends resting upon the collars $i^4\ i^4$, formed upon said studs, when the presser bar H is in its normal position, said bar being pressed downward by the coiled springs $i^5\ i^5$, surrounding said studs between the hand-wheels $i^3$ and the thumb-nuts $i^6$, fitted to the upper ends of said studs as a means of adjusting the tension of said springs. By turning the hand-wheels $i^3$ the presser-bar may be raised or lowered to adapt the space between it and the upper surface of the plate $e$ or the table A' to the body-measure of the type to be dressed.

The presser-bar H has screwed into each end thereof a headed stud, $j$, upon which is mounted a truck, $j'$, which, when the presser-bar H is at the extreme of its motion toward the feed-table end of the machine, rests upon the cam-block $j^2$, secured in a fixed position to the upper side of the table A', thereby holding said presser-bar at a sufficient distance above said table to permit the passage beneath it of the letter ends of the row of types resting upon the plate $e$, with the fins projecting therefrom.

The presser-bar H is moved toward the rear end of the machine by the action of the toothed segments $H^2$, carried by the shaft D, upon the racks H' H', said segments being of sufficient length circumferentially to move said presser-bar from the position it occupies in Figs. 1, 2, and 3 to a position in close proximity to the upper cutter-cylinder, $H^3$, the rear side of said presser-bar being so shaped as to permit its lower edge to pass partially beneath said cutter-cylinder and hold the type firmly while the cutter is removing the fins from the upper sides thereof, said presser-bar having been forced down upon the row of type resting upon the plate $e$ as soon as it commenced to move toward the rear by the reaction of the springs $i^5\ i^5$ and the passage of the truck $j'$ down the inclined surfaces of the cams $j^2$, so as to clamp said type firmly before the lower cutter-cylinder began to act upon the fins upon the lower sides of said type.

At each extreme of the reciprocating movement of the presser-bar H, and as the teeth of the segmental gears $H^2$ are disengaged from the teeth of the racks $H'\ H'$, said racks are locked against accidental displacement by the bolts $j^3$, one to each rack, which are pressed into engagement with the sockets $j^4$, formed in the steel blocks $j^5$, adjustably secured upon the under sides of the rack bars $H'\ H'$ by the springs $j^6$, said bolts being retracted to release said racks on the return oscillation of said segmental gears by the action of the segmental side cams, $H^4$, formed upon said gear-segments, upon trucks $j^7$, mounted upon studs set in said bolts, all as shown in Figs. 23, 24, 25, and 26.

The upper cutter-cylinder, $H^3$, is mounted upon a shaft, $k'$, having its bearings in the adjustable boxes $k^2\ k^2$ and $k^3$, the two boxes $k^2\ k^2$ being fitted to dovetailed vertical grooves formed in the fixed cross-head I, and are adjusted vertically by means of the slotted cam-plate I', acting upon the trucks $k^4\ k^4$, mounted on studs set in said bearings and movable endwise in a horizontal dovetailed groove formed in said cross-head I, by means of the screw-stems $k^5$ and nuts $k^6$, and the box $k^3$ being secured to the edge of the table A' by means of the screws $k^7\ k^7$, passing through slots in said box and screwing into said table, all as shown in Figs. 14, 15, and 16.

The shaft $k'$ of the cutter-cylinder $H^3$ has secured thereon the pulley $k^8$, to which rotary motion is imparted by means of the crossed belt $k^9$, leading thereto from the pulley $k^{10}$ on the shaft of the lower cutter cylinder, F', as shown in Fig. 2.

J is a rectangular steel plate secured to the cast plate J', and having file-like teeth upon its under side, the combined plates being suspended beneath the arched plate $J^2$ by means of the thumb-screw $l$ and leveled by the four set-screws $l'$, screwed through said plate $J^2$, and resting at their lower ends upon bosses cast upon the plate J', an elliptic spring, $l^2$, being interposed between the plates J' and $J^2$, all as shown in Figs. 1, 2, and 3.

The extreme rear end of the table A' has cut through it an oblong rectangular open slot to receive the packing off box K, having an open top and a removable side, said box being suspended from said table, with its upper surface, except the removable cover, flush with the upper surface of said table, by means of two horizontal lips or tongues, $m\ m$, on said table, which fit into corresponding grooves formed in the end walls of said box near its upper end, as shown in Fig. 28.

The rear covering-plate, K', is secured to the box K by the thumb-screws $m'\ m'$, and has formed therein the two vertical slots $m^2\ m^2$ to receive guiding-ribs on the brackets L, and the bolts $n\ n$, which connect said brackets to the clamping-springs $n'\ n'$ upon the exterior of the covering-plate K', whereby said brackets are adapted to be held in any desired position within the box K until they are moved downward by applying force thereto. The plate K' extends somewhat above the upper surface of the table A', and has set in a recess in its inner face, opposite the upper face of said table, a strip of rubber, $m^3$, to prevent injury to the face of the type as they are fed into contact therewith by the type-feed plate G.

Directly above the packing-box K is the slotted gage-bar M, having a bearing at each end upon a vertical stud, $n^2\ n^2$, set in the table A', and movable vertically thereon to adjust its position to the size of type, being operated upon. The studs $n^2\ n^2$ are each fitted with the milled nut $n^3$ and the thumb-nut $n^4$, for adjusting the tension of the springs $o$ and $o'$, the latter of which is interposed between the bar M and the nut $n^3$ and serves to press the bar M downward. The bar M is adjusted to the desired position by placing between it and the table A' two dressed type of the same body-measure as those being operated upon, as shown at $x$, Fig. 28.

N is a vertically-movable presser-bar having a bearing at each end on the studs $n^2\ n^2$, and provided at its center with the pendent plate N', of a width equal to the interior width of the box K and a thickness corresponding to the width of the central slot in the bar M, through which it is moved at the proper time to press down the finished type last fed beneath said bar till their upper surfaces are on a level with the upper surface of the table A' preparatory to another line of type being fed beneath said bar M.

The presser-bar N is forced downward by its own weight and the tension of the springs $o\ o$, and is moved upward by the cam-bars $o^2\ o^2$, cast upon or secured to the upper sides of the rack-bars $h\ h$, acting upon the trucks $o^3\ o^3$, mounted upon horizontal journals set in the forked lower ends of the downwardly-projecting arms $o^4\ o^4$ of the presser-bar N, as shown in Figs. 28 and 30.

The box K, of cast-iron, has fitted therein a lining-box of sheet-brass or other comparatively soft metal, $p$, which, when filled with type, is removed with the type therein and another similar lining is substituted therefor. The box K is secured in position against accidental displacement by means of the buttons $p'\ p'$ or any other readily-operated locking or clamping device. The plate K' extends below the bottom of the box K, as also do the slots $m^2$ $m^2$, and the bottoms of the box K and lining $p$ have transverse slots cut through them to permit the passage of the brackets L, so that the plate $p^2$, which rests upon said brackets L and supports the mass of type contained in said box, may descend until it rests upon the bottom of the lining $p$ of the box K.

The gage-bar M has formed on its inner side the longitudinal dovetailed groove $q$, in which is fitted so as to be reciprocated therein the tool-carrying clamp $r$, in which is firmly clamped, by means of the bolt $r'$, the cutter $r^2$, designed and adapted to plane a groove in the spur ends of a row of type after they have been fed beneath the bar M.

P is a connecting-rod pivoted at one end to the tool-carrier $r$ and at the other end to one end of the slotted lever P', the other end of which is pivoted to the table A', and to which a vibratory movement is imparted by the crank-pin $r^3$, set in the disk P² and engaging with the slot $r^4$ in said lever P', as shown in Fig. 1. The disk P² is secured to the upper side of the beveled pinion P³, mounted upon a stud set in the table A', and has an intermittent rotary motion imparted thereto by the engagement with said pinion of the segmental gear C², mounted upon the shaft C', the length of said segment being just sufficient to impart to said pinion one complete revolution during about one-seventh of a revolution of said shaft C', said pinion remaining stationary during the remainder of said revolution of the shaft C'. When the revolution of the pinion P³ is completed, said pinion is locked by the bolt $s$, which is pressed into engagement with the socket $s'$, formed in the under side of said pinion, by the spring $s^2$, said bolt being retracted again before another engagement of the toothed segment with the teeth of the pinion by the action of the cam-segment P⁴ upon the truck $t$, mounted upon a stud set in the side of the locking-bolt $s$, all as shown in Figs. 32, 33, and 34.

The proper vertical adjustment of the upper cutter-cylinder, H³, for any particular job may be readily determined by placing upon the table A', beneath the smooth collars $u$ $u$, secured to the ends of said cylinder and having a diameter corresponding accurately with the extreme diameter of said cylinder, measuring through the points of the teeth, two type or pieces of steel having a thickness just equal to the desired measurement to be given to the type to be dressed, and then adjusting said cylinder downward until the collars $u$ $u$ rest upon said type.

The operation of the machine is as follows: The several parts of the machine being in the positions shown in Figs. 1, 2, and 3 and power being applied to the pulleys B', $d'$, and F² to set their respective shafts in motion in the directions indicated by the arrows upon said pulleys, a series of type are placed upon each end of the feed-table with their nicked sides uppermost, as shown in Fig. 6. When the shaft D has moved about its axis sufficiently for the cam E to permit the descent of the elevator-platform to a level with the upper surface of the feed-table A², an operator upon one or both sides of said feed-table moves a single type onto the bar $c'$, with its side against the gage $c^2$ and its letter end toward the opposite end of the machine, when the movement of said bar $c'$ toward the rear of the machine carries said type to a position opposite the end of the elevator-platform $c$ by the action of the crank-pin $c^6$ upon the straight portion of the slot $c^5$ in the lever $c^3$, at which time the crank-pin enters the curved portion of said slot and the bar $c'$ remains at a standstill until the plunger $d^4$ is moved inward by the action of the cam $d^2$ and pushes the type upon the elevator-platform $c$. These operations are repeated upon one or both sides of the feed-table until a row or line of type four inches in length is deposited upon said elevator-platform, and at the proper time the elevator is raised to the position shown in Fig. 3, carrying upward the line of type to a level with the upper surface of the table A, when the feed-plate G, which, while the line of type was being set up, has been carried from the position shown in Fig. 1 to the opposite end of the machine and back again to its original position, is again moved toward the opposite end of the machine, moving the line of type from the elevator-platform upon the plate $e$ and across the same till the fins near the head of the type drop over the inner edge of the plate $e$, so that the type will lie level upon said plate, the type in said line being prevented from speading or separating from each other in the direction of the length of the line by the ends of the rectangular notch formed in the inner edge of the plate G, which incloses the line of type. When the type have been fairly deposited upon the plate $e$, with their heads projecting beyond its inner edge, the plate $e$ is moved in unison with the plate G by the engagement of the tooth $h^3$ with the forked lug $h^2$ until the heads and fins of said type have passed to the inner side of the presser-bar H, when said presser-bar also moves toward the rear end of the machine in unison with the plates G and $e$, and as it passes from the fixed cam-blocks $j^2$ it presses upon and clamps the line of type to the plate $e$. The two plates G and $e$ and the presser-bar H move together until the inner edge of the plate $e$ reaches the cutter-cylinder F' and the fins have been removed from the under sides of said line of type, when the tooth $h^3$ is disengaged from the forked lug $h^2$, and the same is locked to prevent further forward movement of said plate $e$. The plate G and the presser-bar H continue to move in unison to carry the line of type over the cutter-cylinder F' and the abrading-surface F and until the presser-bar is in close proximity to the upper cutter-cylinder, H³, when the toothed segments H² are disengaged from the rack-bars H' H', which carry the presser-bar, and the same is locked against any further movement in the same direction, and the feed-plate G continues its movement toward the rear end of the machine, carry the line of type beneath the abrading surface or plate J and beneath the bar M and upon the plate $p^2$, which is adjusted to a position with its upper surface on a level with the upper surface of the table A' when no type have been deposited thereon. The plate G immediately commences its return movement, the same being caused by the reversal of the motion of the shaft D and the gears G', and at the proper times in said return movement the presser-bar H and the plate $e$ are unlocked and commence their return movement, moving in unison with the plate G until the several parts have assumed the positions shown in Figs. 1, 2, and 3, and another line of type, which in the meantime has been set up upon the elevator-platform $c$, is raised into a position to be fed upon the plate $e$ by the next movement of the plate G toward the rear end of the machine. While the plate G is making its return movement toward the front end of the machine the toothed segment $C^2$ engages with the bevel-pinion $P^3$ and imparts to it a revolution, the advancing end of the segmental cam $P^4$ having previously retracted the bolt $s$ holds said bolt retracted until the revolution of the pinion is completed; when said cam releases said bolt and it is again engaged with the pinion by the reaction of the spring $s^2$, as before described. By this revolution of the pinion $P^3$ and the crank-disk $P^2$ the cutter $r$ is moved from a position at one end of the line of type just fed under the bar M to the opposite end thereof, cutting a groove in the end of each type in the line, and is returned to its former position, all of which is accomplished before the cam-bars $o^2 o^2$ have been withdrawn from beneath the trucks $o^3 o^3$ of the presser-bar N, at which time the bar N descends by its own weight and the tension of the springs $o\ o$ a distance just sufficient to press the line of type into the box K until the upper surface of said line of type is on a level with the upper surface of the table A', so that another line of type may be fed under the bar M above said first line, the presser-bar N being moved upward again by the action thereon of the cam-bars $o^2 o^2$ before the second line of type reaches said bar. These operations are repeated until the box K, or the lining thereof, is filled with a series of lines of type two sides of each line of which have been dressed, when the box K is removed from the table A', turned upon its side, the cover K' is removed, the lining-box $p$, with the type contained therein, is removed from the box K, another lining-box $p$ is inserted in said box K, the cover K' is secured thereto, the box K is again placed in position and secured to the table A', and the brackets L, with a plate, $p^2$, thereon, are raised to the top of said box, or to a point with the upper surface of the plate $p^2$ on a level with the upper surface of the table preparatory to the operations being repeated of dressing two sides of a succession of lines of type and filling another lining-box $p$ therewith. When all of the type in one lot have been dressed upon two sides, they are returned to the feeding end of the machine and are again passed through the machine to dress the other two sides, for which purpose the type may be placed upon the feed-table and set up as before, or the type may be transferred from the box $p$ to the plate $e$ by dividing the mass of the type in the box into vertical lines and moving them line by line, and placing said lines of type upon said plate $e$ with one of their undressed sides resting upon said plate, with their letter ends and the fins thereon overhanging the inner edge of said plate. When the plate G has moved a short distance on its return toward the front or feed-table end of the machine, the highest parts of the cam-bars $o^2 o^2$ pass from beneath the trucks $o^3 o^3$, thus permitting a slight descent of the bar N, when the detent-notch $u'$, formed in one side of the pendent plate N' of the bar N, is brought opposite to a correspondingly-shaped tooth formed upon the vertically-arranged steel bar $u^2$, secured by the bolt $u^3$ to the L-shaped stand $v$, which in turn is movably attached to the bar M by means of the screws $v' v'$, passing through a slot in said stand and screwing into the bar M, and is pressed inward by a suitable spring, $w$, to cause the lower end of the bar $u^2$ to press against the line of type and press them firmly together and against the fixed bar $w'$, secured to the bar M at the opposite end of the slot in said bar through which the plate N' of the bar N works, so as to hold said line of type firm while the grooves are being formed in the ends of said type.

What I claim as new, and desire to secure by Letters Patent of the United States, is—

1. In a machine for dressing type, the combination of a stationary feed-table located at a different level from the level of the main table, an elevator-platform arranged with its upper surface on a level with said feed-table, a reciprocating type-carrying bar, a gage for locating the type on said bar, a reciprocating plunger movable in a direction at right angles to the movement of said type-carrying bar, and mechanism, substantially as described, for moving said elevator-platform from the level of the feed-table to the level of the main table, all arranged and operating as set forth, whereby a row of type may be set up on said elevator and carried to a position where they can be fed upon said main table.

2. The combination of the feed-table $A^2$, the type-carrying bar $c'$, the slotted lever $c^3$, the crank-pin $c^6$, the cam $d^2$, the plunger $d^4$, the gage $c^2$, the elevator $c$, the lever E', and the cam E, all constructed, arranged, and adapted to operate substantially as described.

3. In a machine for dressing type, the combination of a reciprocating feed-plate constructed and arranged to feed a series of type arranged side by side in a line along a stationary bed, a rotary cutter-cylinder for removing the fins from the under sides of said type, a stationary abrading-surface for dressing the under sides of said type, a rotary cutter-cylinder for removing the fins from the upper sides of said type, and a stationary flat abrading-surface for dressing the upper sides of said type, all arranged to operate in the order named.

4. The combination of the presser-bar H, the toothed racks H'H', connected thereto and provided with the sockets $j^4 j^4$, the bolts $j^3$, the springs $j^6$, the oscillating toothed segments $H^2$ $H^2$, and the segmental side cam, $H^4$, all constructed, arranged, and adapted to operate substantially as and for the purposes described.

5. The combination of the table A', the cam-blocks $j^2 j^2$, secured thereto, the toothed rack-bars H' H', having set therein the studs $i\ i$, the presser-bar H, mounted and vertically movable upon said studs, the trucks $j' j'$, the springs $i^5$ $i^5$, and the oscillating toothed segment $H^2$, all constructed, arranged, and adapted to operate substantially as and for the purposes described.

6. The combination of the table A', the bars $h' h'$, fitted to grooves in said table, the forked lugs $h^2 h^2$, secured to the under sides of said bars, the plate $e$, secured to the upper sides of both of said bars, and the oscillating arms $G^2$ $G^2$, each provided with the tooth $h^3$, for engaging with the fork of one of the lugs $h^2$, substantially as described.

7. The combination of the plate $e$, the bars $h' h'$, the lugs $h^2 h^2$, each having formed in its side a notch or socket, $g^4$, the bolts $g^3 g^3$, the levers $g^5 g^5$, the segmental cams $g^7$, and the oscillating arms $G^2 G^2$, each provided with a tooth, $h^3$, to engage with one of the lugs $h^2$, substantially as described.

8. In a type-dressing machine, the combination of the table A', the plates $e$ and G, the presser-bar H, and mechanisms, constructed and arranged as set forth, to move said plates and presser-bar along said table through different distances, but in unison when more than one is moving, substantially as described.

9. The combination of the cutter-cylinder F', the bearings $f f$ and $f'$, the wedges $g\ g$, the adjusting-screw $g'$, and the clamping-bolts $f^2 f^2$, substantially as described.

10. The combination of the cutter-cylinder $H^3$, the fixed cross-head I, the boxes $k^2 k^2$, fitted to vertical guiding-grooves formed in said cross-head and provided with the trucks $k^4 k^4$, the horizontally-movable cam-plate I', the adjusting screw-stem $h^5$, and the nuts $k^6$, substantially as described.

11. The combination of the rack-bars $h\ h$, the plate G, secured to the upper sides of said bars, the vertically-movable presser-bar N, provided with the trucks $o^3 o^3$, the springs $o\ o$, the cam-bars $o^2 o^2$, and the oscillating gear-wheels G' G', all constructed, arranged, and operating substantially as described.

12. The box K, provided with the detachable side K', having the vertical slots $m^2 m^2$ and the rubber strip $m^3$, the lining $p$, of soft metal, the brackets L, the springs $n' n'$, the bolts $n\ n$, and the plate $p'$, substantially as described.

13. The combination of the box K, the brackets L, the bolts $n\ n$, the springs $n' n'$, the plate $p'$, the gage-bar M, the presser-bar N, the springs $o\ o$, the rack-bars $h\ h$, the cam-bars $o^2 o^2$, and mechanism, substantially as set forth, for imparting to said rack and cam-bars a reciprocating motion, all constructed, arranged, and operating substantially as described.

14. The combination of the gage-bar M, the tool-clamping carrier $r$, fitted to and movable in a guideway formed in said bar, the rod P, the slotted lever P', the crank-pin $r^3$, the bevel-pinion $P^3$, and the revolving bevel segmental gear $C^2$, all constructed, arranged, and operating substantially as described.

15. In combination with the reciprocating tool-carrier $r$, the rod P, lever P', the crank-pin $r^3$, bevel-pinion $P^3$ and bevel-segment $C^2$, the bolt $s$, the socket $s'$, formed in the bevel-pinion, the spring $s^2$, and the segmental cam $P^4$, substantially as described.

16. In combination with the bars M and N and the reciprocating tool-carrier $r$, the detent-notch $u'$, formed in the side of the pendent plate N' of the bar N, the toothed bar $u^2$, the boxed bar $w'$, the stand $v$, and the spring $w$, all constructed, arranged, and operating substantially as described.

In testimony whereof I have signed my name to this specification, in the presence of two subscribing witnesses, on this 24th day of May, A. D. 1886.

WILLIAM H. WELSH.

Witnesses:
  N. C. LOMBARD,
  WALTER E. LOMBARD.